US012594146B2

(12) United States Patent
Albalbeesi et al.

(10) Patent No.: US 12,594,146 B2
(45) Date of Patent: Apr. 7, 2026

(54) UPPER EXPANSION ORTHODONTIC RETAINER

(71) Applicant: KING SAUD UNIVERSITY, Riyadh (SA)

(72) Inventors: Hana Omar Albalbeesi, Riyadh (SA); Amal Omar Albalbeesi, Riyadh (SA); Wadea Taher Almuaibed, Riyadh (SA); Essam Ali Al-Bahkali, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/226,971

(22) Filed: Jul. 27, 2023

(65) Prior Publication Data

US 2025/0032220 A1 Jan. 30, 2025

(51) Int. Cl.
*A61C 7/08* (2006.01)
*B29C 33/38* (2006.01)
(Continued)

(52) U.S. Cl.
CPC ............ *A61C 7/08* (2013.01); *B29C 33/3857* (2013.01); *B29C 51/00* (2013.01);
(Continued)

(58) Field of Classification Search
CPC ..... B29C 39/42; B29C 41/50; B29C 33/3857; B29C 51/00; B29C 2033/3871;
(Continued)

(56) References Cited

U.S. PATENT DOCUMENTS 9,943,991 B2 * 4/2018 Tanugula .................. A61C 7/08
2004/0009449 A1 * 1/2004 Mah .......................... A61C 7/10
433/7

(Continued)

OTHER PUBLICATIONS

Boss Productions ("How to Pour Up an Essix Impression"— Uploaded to www.youtube.com on Apr. 29, 2022; https://www. youtube.com/watch?app=desktop&v=JOU1Fmm9SbM&t=449). (Year: 2022).*

(Continued)

*Primary Examiner* — Ariella Machness
(74) *Attorney, Agent, or Firm* — Nath, Goldberg & Meyer; Joshua B. Goldberg

(57) ABSTRACT

An orthodontic retainer includes a first material forming a contact surface for the buccal, occlusal, labial, and lingual surfaces of the maxillary teeth. The first material has a number of holes formed bi-laterally in the lingual surface. The orthodontic retainer includes a second material forming a contact surface for the palatal portion of the upper arch dentition. The second material is formed with several bulges that mate with corresponding holes within the first material. A method of forming the orthodontic retainer includes casting an impression, vacuum forming a first material over the cast of the teeth, trimming the first material in proximity to the gingival contours, drilling a number of holes in a lingual surface of the first material, applying a second material to the palatal portion of the cast and the holes of the first material, and curing the second material to the first material.

7 Claims, 9 Drawing Sheets

(51) Int. Cl.
    *B29C 51/00*         (2006.01)
    *B29K 33/00*         (2006.01)

(52) U.S. Cl.
    CPC .. *B29C 2033/3871* (2013.01); *B29K 2005/00*
        (2013.01); *B29K 2023/06* (2013.01); *B29K*
        *2033/12* (2013.01)

(58) Field of Classification Search
    CPC ........ A61C 7/08; A61C 7/10; B29K 2023/06;
        B29K 2033/12
    See application file for complete search history.

(56)            References Cited

U.S. PATENT DOCUMENTS

| | | | | |
|---|---|---|---|---|
| 2009/0117506 | A1* | 5/2009 | Igari | A45D 44/22 |
| | | | | 433/6 |
| 2017/0281315 | A1* | 10/2017 | Sotiropoulos | A61C 7/10 |
| 2018/0153733 | A1 | 6/2018 | Kuo | |
| 2021/0244500 | A1* | 8/2021 | Sheehy | A61F 5/566 |
| 2023/0100712 | A1 | 3/2023 | Dorfinger et al. | |
| 2023/0158716 | A1* | 5/2023 | Nishimuta | B29C 51/30 |
| | | | | 264/16 |
| 2023/0355353 | A1* | 11/2023 | Kimura | A61C 7/08 |

OTHER PUBLICATIONS

Like a Boss Productions ("How to Pour Up an Essix Impression"—
Uploaded to www.youtube.com on Apr. 29, 2022; https://www.
youtube.com/watch?app=desktop&v=JOU1Fmm9SbM&t=449) (Year:
2022).*

Ashari, Asma et al., Universiti Kebangsaan Malaysia, Ministry of
Health, Selangor, Malaysia, "One-year comparative assessment of
retention of arch width increases between modified vacuum-formed
and Hawley retainers: A multicenter randomized clinical tria" Mar.
1, 2022; 92 (2):197-203; PubMed; Angle Orthodontist.

* cited by examiner

100

DENTITION IMPRESSION AND CAST FORMATION.
10

MATERIAL #1 THERMOFORMED OVER CAST AND TRIMMED.
20

MATERIAL #2 APPLIED TO MATERIAL #1 AND CURED.
30

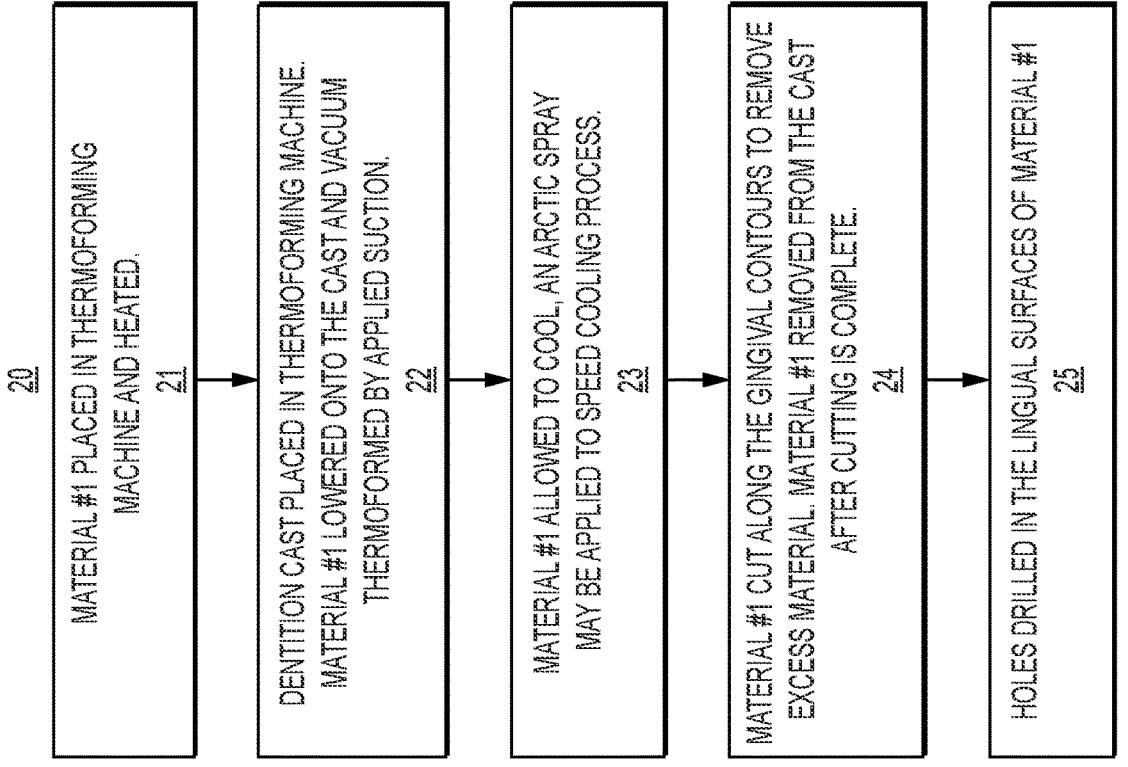

20

MATERIAL #1 PLACED IN THERMOFORMING
MACHINE AND HEATED.
21

DENTITION CAST PLACED IN THERMOFORMING MACHINE.
MATERIAL #1 LOWERED ONTO THE CAST AND VACUUM
THERMOFORMED BY APPLIED SUCTION.
22

MATERIAL #1 ALLOWED TO COOL, AN ARCTIC SPRAY
MAY BE APPLIED TO SPEED COOLING PROCESS.
23

MATERIAL #1 CUT ALONG THE GINGIVAL CONTOURS TO REMOVE
EXCESS MATERIAL. MATERIAL #1 REMOVED FROM THE CAST
AFTER CUTTING IS COMPLETE.
24

HOLES DRILLED IN THE LINGUAL SURFACES OF MATERIAL #1
25

*FIG. 4B*

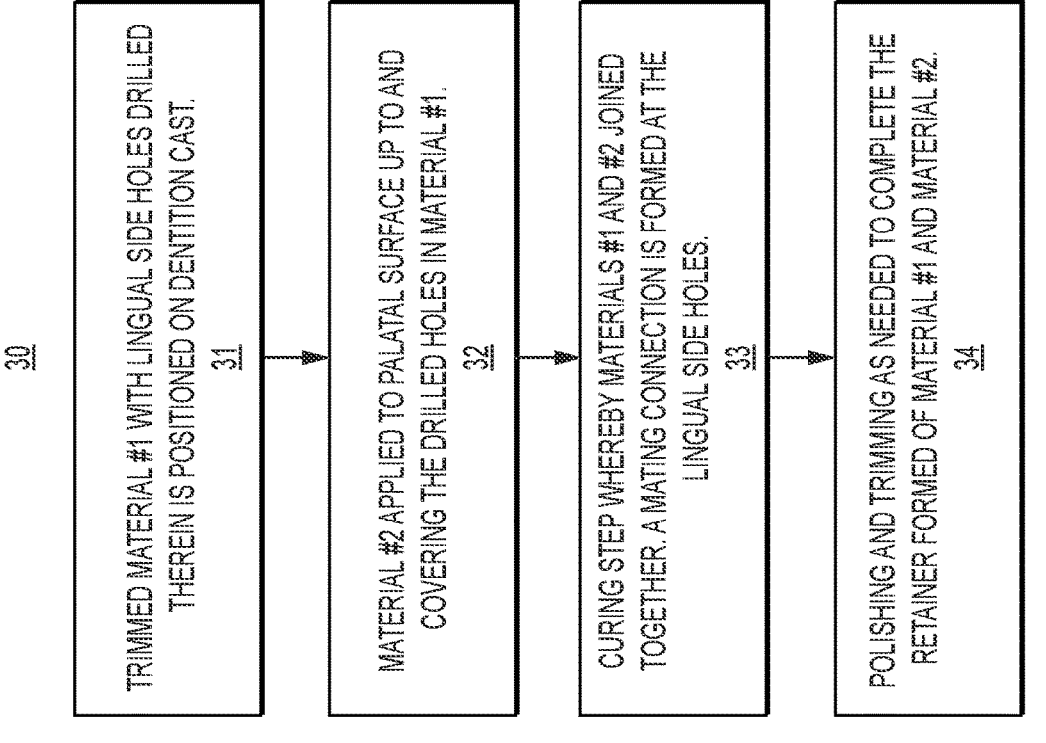

30

TRIMMED MATERIAL #1 WITH LINGUAL SIDE HOLES DRILLED THEREIN IS POSITIONED ON DENTITION CAST.
31

MATERIAL #2 APPLIED TO PALATAL SURFACE UP TO AND COVERING THE DRILLED HOLES IN MATERIAL #1.
32

CURING STEP WHEREBY MATERIALS #1 AND #2 JOINED TOGETHER. A MATING CONNECTION IS FORMED AT THE LINGUAL SIDE HOLES.
33

POLISHING AND TRIMMING AS NEEDED TO COMPLETE THE RETAINER FORMED OF MATERIAL #1 AND MATERIAL #2.
34

*FIG. 4C*

UPPER EXPANSION ORTHODONTIC RETAINER

BACKGROUND

Field

The disclosure of the present patent application relates to orthodontic retainers, and particularly to an orthodontic retainer for the maxillary (upper) teeth made of first and second materials.

Description of Related Art

Orthodontic retainers are devices used to hold a person's teeth in a particular position/alignment after surgery or after completion of another method of teeth re-alignment, such as the use of braces. After orthodontic treatment, there is a risk of the teeth returning to their original position due to occlusion (contact between teeth) and a patient's natural growth and development. Retainers are used to keep teeth aligned and ensure long lasting results for the appearance and smile of a person's teeth.

Various types of retainers have been used previously. The two most commonly used types of retainers include Hawley and Vacuum-formed retainers. Hawley retainers are one of the oldest types of retainers and consist of metal wires surrounding the anterior teeth anchored in an acrylic baseplate that sits in the palate (roof of the mouth). Additional wires in a Hawley retainer may run along the outside of the buccal (facing cheeks) surfaces of the teeth. The main disadvantages of Hawley type retainers are the aesthetic appearance of wires covering the teeth, as well as speech interference, risk of tooth fracture, and inferior retention of the lower incisors in comparison to vacuum-formed retainers. An advantage of Hawley retainers is the ability to maintain upper arch expansion after orthodontic treatment due to the acrylic baseplate used to cover the palatal surface.

A newer type of retainer that has gained popularity, vacuum-formed retainers (VFRs) such as Essix retainers are made from plastics using a thermoforming process. A clear and transparent retainer is formed that fits over the arch of the teeth. The main advantage of a VFR is the aesthetic appearance in comparison to other retainers. A disadvantage of VFR retainers is the potential lack of rigidity in comparison to Hawley retainers to maintain an expanded maxillary arch due to the lack of palatal coverage.

Thus, an improved orthodontic retainer solving the aforementioned problems is desired.

SUMMARY

Described herein is a new orthodontic retainer, which is an improved version of a vacuum-formed retainer constructed to cover the palatal surface and the upper arch dentition (the upper portion of teeth within the mouth), preserving upper arch expansion and preventing aligned teeth from relapsing to their original position after orthodontic treatment. The present orthodontic retainer can include a first material forming a contact surface for the buccal, occlusal, labial, and lingual surfaces of the maxillary (upper) teeth. The first material can have a number of holes formed bi-laterally in the lingual surface. The present orthodontic retainer can include a second material forming a contact surface for the palatal portion of the upper arch dentition. The second material can be formed with several bulges that mate within corresponding holes of the first material.

A method of forming the present orthodontic retainer is also described. The method can include a step of casting an impression of the maxillary teeth, followed by vacuum forming a first material over the cast of the teeth. The first material can then be cut along a path in proximity to the gingival contours of the cast on the facial and lingual sides (i.e., front and back sides of the teeth) to remove any excess amounts of first material. The remaining portion of the first material can cover the facial, lingual, and occlusal surfaces of the maxillary teeth while leaving the palatal surface uncovered.

Next, a number of holes can be drilled bi-laterally in the lingual surface of the first material. After the drilling step, a second material can be applied which covers the palatal portion of the cast and the number of holes drilled in the first material. After the second material is applied, it can then be cured to form a bond with the first material.

Accordingly, the present orthodontic retainer can be manufactured from two cohesive materials. A thermoplastic resin such as polyethylene may be used for the first material to cover the buccal, lingual, and occlusal surfaces of the maxillary teeth from the right-side last molar to the left side last molar. An acrylic such as methyl methacrylate (MMA) may be used as the second material to cover the palatal surface. Benefits of the present orthodontic retainer include reinforced expansion stability of the upper arch, increased retention, and improved strength against breakage, while maintaining comfort and an aesthetically pleasing appearance for the user.

As such, in an embodiment, the present subject matter relates to a method of forming an orthodontic retainer, comprising: creating a cast based on an impression of a patient's maxillary teeth; vacuum forming a first material over said cast; trimming excess first material such that only first material configured to cover facial, lingual, and occlusal surfaces of the patient's maxillary teeth remains on the cast; removing the first material remaining on the cast to obtain a first portion of the retainer; trimming said first portion of the retainer along a path following gingival contours of the first portion of the retainer; drilling a plurality of holes bi-laterally in the lingual surface of the first portion of the retainer; applying a second material covering a free palatal portion and the plurality of holes drilled in the first portion of the retainer; curing said second material to obtain a second portion of the retainer bonded to said first portion of the retainer; and obtaining the orthodontic retainer comprising the first portion of the retainer and the second portion of the retainer.

In another embodiment, the present subject matter relates to an orthodontic retainer comprising: a first material forming a contact surface for buccal, occlusal, labial, and lingual surfaces of a patient's upper dentition, said first material having a plurality of holes formed bi-laterally in a lingual surface thereof; a second material forming a contact surface for a palatal portion of the patient's upper dentition, the second material having a plurality of bulges that mate with the plurality of holes in the first material.

These and other features of the present subject matter will become readily apparent upon further review of the following specification.

BRIEF DESCRIPTION OF DRAWINGS

FIG. 4B is a flowchart illustrating specific steps in the formation of the first material used in the orthodontic retainer.

FIG. 4C is a flowchart illustrating specific steps in the formation of the second material used in the orthodontic retainer.

FIG. 5A illustrates application of a liquid portion of a second material on the palatal surface used in the orthodontic retainer.

FIG. 5B illustrates application of a powder portion of a second material on the palatal surface used in the orthodontic retainer.

FIG. 5C illustrates application of a liquid component of a second material on the lingual surface used in the orthodontic retainer.

FIG. 5D illustrates the application of a powder component of a second material on the lingual surface used in the orthodontic retainer.

Similar reference characters denote corresponding features consistently throughout the attached drawings.

DETAILED DESCRIPTION

Figure 1B:
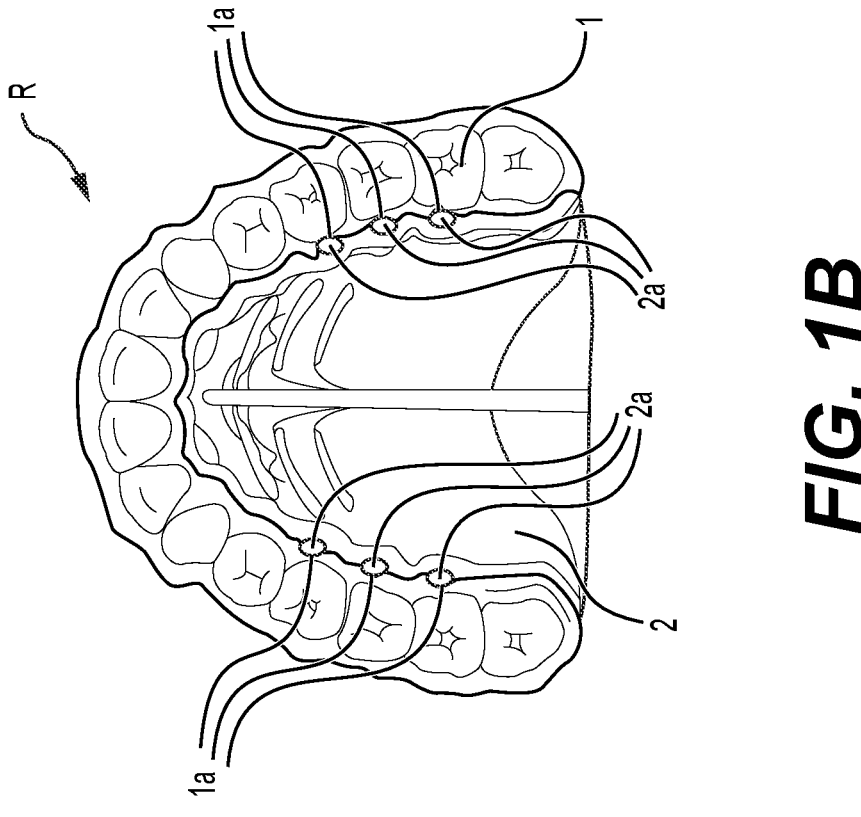
FIG. 1B is an overhead view of the orthodontic retainer.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a method of forming an orthodontic retainer, comprising: creating a cast based on an impression of a patient's maxillary teeth; vacuum forming a first material over said cast; trimming excess first material such that only first material configured to cover facial, lingual, and occlusal surfaces of the patient's maxillary teeth remains on the cast; removing the first material remaining on the cast to obtain a first portion of the retainer; trimming said first portion of the retainer along a path following gingival contours of the first portion of the retainer; drilling a plurality of holes bi-laterally in the lingual surface of the first portion of the retainer; applying a second material covering a free palatal portion and the plurality of holes drilled in the first portion of the retainer; curing said second material to obtain a second portion of the retainer bonded to said first portion of the retainer; and obtaining the orthodontic retainer comprising the first portion of the retainer and the second portion of the retainer.

In certain embodiments, the first material used in the present methods can comprise a polymer. One suitable non-limiting polymer in this regard is polyethylene. In other embodiments, the second material can comprise an acrylate. One suitable non-limiting acrylate in this regard is methyl methacrylate. Accordingly, in an embodiment, the first material can be polyethylene and the second material can be methyl methacrylate.

In a further embodiment of the present methods, the cast can be created by taking an alginate impression of the patient's maxillary teeth and palate using a metal perforated tray, then using said alginate impression to form the cast from quick-set plaster free of bubbles and any palatal distortion.

In certain embodiments, the first material can be cut above the gingival contours by about 1 to about 2 mm labially and buccally until the most distal tooth is reached. Further, once the first material is cut, holes can be incorporated in the palatal surface by about 3 mm to about 4 mm palatally.

In other embodiments, the method of making the retainer can take about 30 minutes, total.

In another embodiment, the present subject matter relates to an orthodontic retainer comprising: a first material forming a contact surface for buccal, occlusal, labial, and lingual surfaces of a patient's upper dentition, said first material having a plurality of holes formed bi-laterally in a lingual surface thereof; a second material forming a contact surface for a palatal portion of the patient's upper dentition, the second material having a plurality of bulges that mate with the plurality of holes in the first material.

In certain embodiments, the first material used in the present retainer can comprise a polymer. One suitable non-limiting polymer in this regard is polyethylene. In other embodiments, the second material can comprise an acrylate. One suitable non-limiting acrylate in this regard is methyl methacrylate. Accordingly, in an embodiment, the first material can be polyethylene and the second material can be methyl methacrylate. Regardless of the specific components used, in certain embodiments, they can be resistant to stain and abrasion, durable, resilient, reflect light of the surface they cover, and able to prevent maxillary expansion relapse.

In a further embodiment, the bulges formed in the second material can be used to reinforce palatal expansion stability and strengthen the joint between the first material and the second material at the holes in the first material. As such, the retainer as disclosed herein will have improved strength against breakage and/or damage, will have increased retention, durability, rigidity, and/or strength.

In use, the retainer as described herein can be used to reinforce expansion stability and prevent forward movement of posterior teeth after orthodontic treatment through the palatal coverage with the second material added to the design of the original Essix retainer, or the first material.

Usage of the second material can provide extra function for palatal expansion stability. In another embodiment, the retainer can be translucent.

In certain embodiments, the retainer is configured such that it does not need regular periodic adjustments. Further, the present retainers can provide dual benefits: retaining upper arch expansion and correcting dentition from relapsing back to their original position prior to orthodontic treatment via covering the palate with the second material and adhering it to the first material after creating holes closely positioned to premolars and molars to enhance cohesion between both materials, and to reinforce strength and rigidity.

Figure 1A:
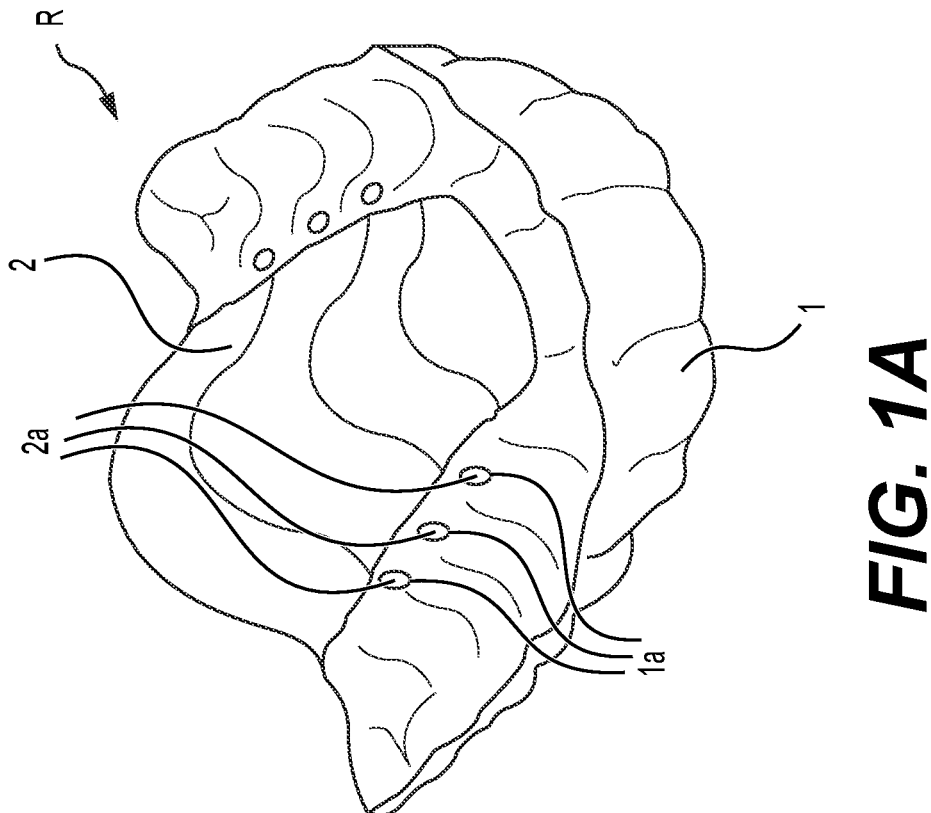
FIG. 1A is a perspective view of the orthodontic retainer.

Referring to the specific embodiments as shown in the attached figures, FIGS. 1A and 1B show an example embodiment of an upper expansion orthodontic retainer R. Orthodontic retainer R is formed of a first material 1 covering the buccal, lingual, and occlusal surfaces of the maxillary teeth from the right-side last molar to the left-side last molar. The orthodontic retainer R is formed of a second material 2 on the palatal surface to reinforce expansion stability of the upper arch dentition. A number of holes 1A are formed in the first material 1 through which a number of bulges 2a of the second material 2 mate the second material 2 to the first material 1. The mating arrangement provided by the holes 1a in first material 1 and bulges 2a formed in second material 2 provides for increased unity between materials 1 and 2, thereby enhancing the strength and rigidity of the retainer R against breakage and damage.

Figure 2B:
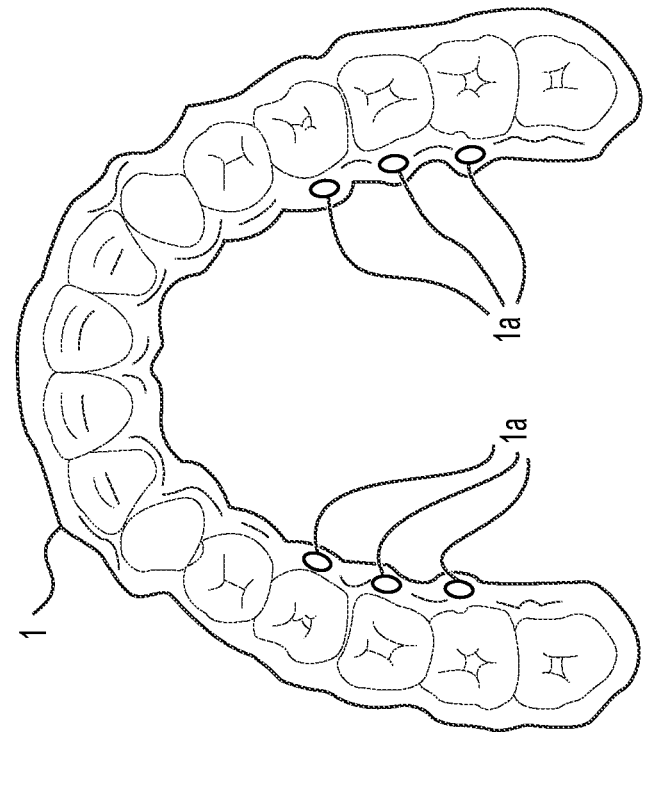
FIG. 2B is a bottom view of a first material of the orthodontic retainer.
Figure 2B:
Figure 2A:
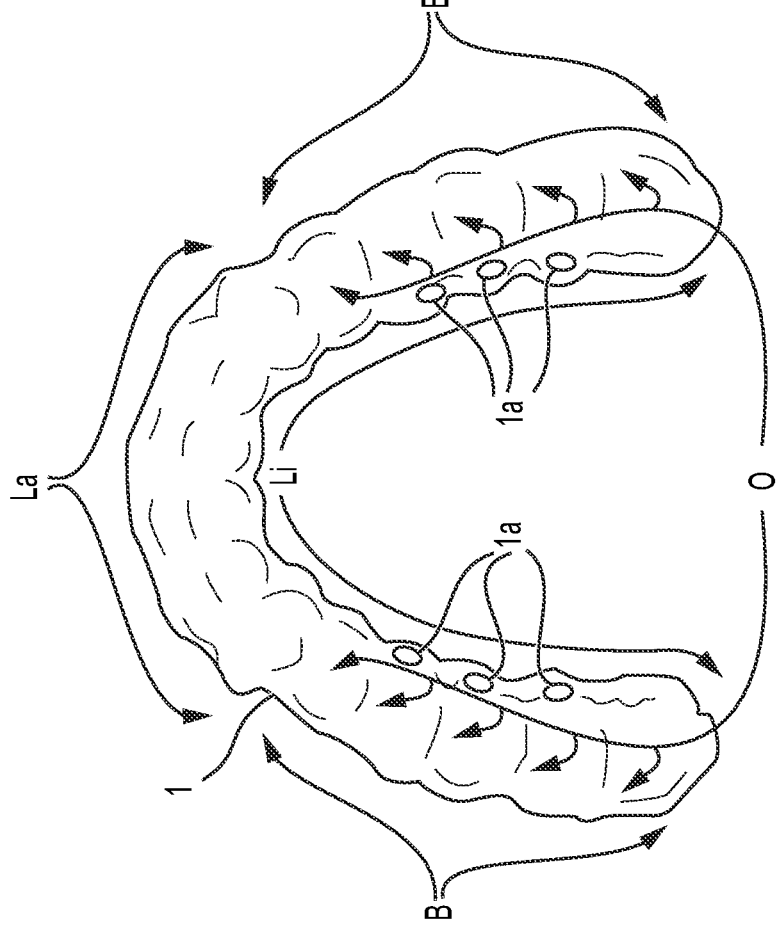
FIG. 2A is an overhead view of a first material of the orthodontic retainer.

FIGS. 2A and 2B are top and bottom views, respectively, of first material 1 forming a contact surface for the buccal B (facing cheeks), labial La (facing lips), lingual Li (facing tongue), and occlusal O (biting) surfaces of the maxillary teeth. FIGS. 2A and 2B show an embodiment in which 3 holes 1a are drilled bi-laterally in the lingual surface of the first material 1. While the embodiment shows 3 holes drilled in the lingual surfaces, any suitable number of holes may be used in the manner set forth herein.

Figure 3:
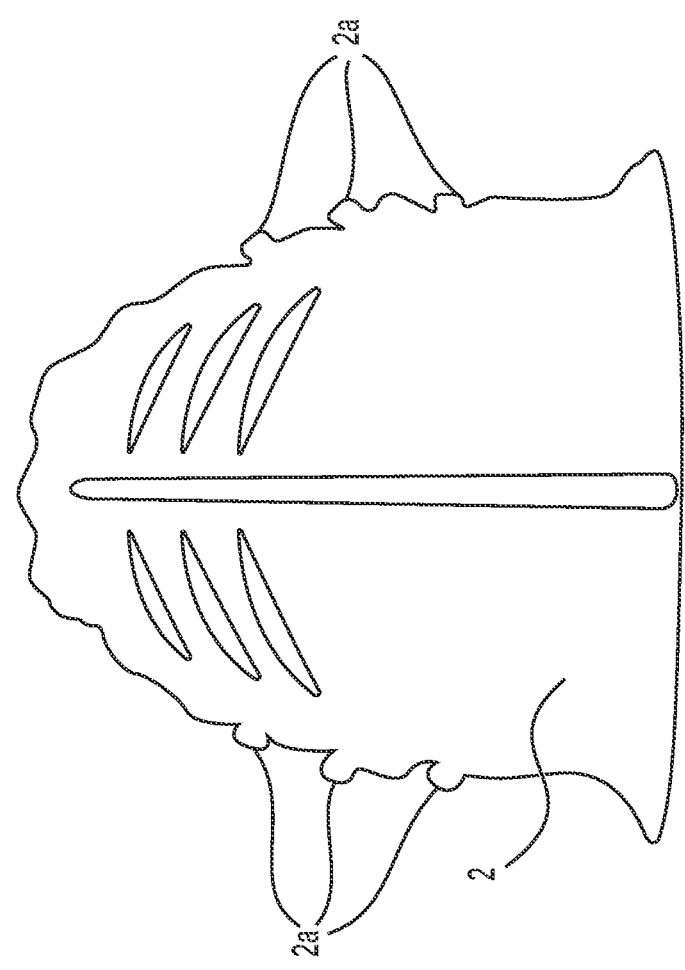
FIG. 3 is an overhead view of a second material of the orthodontic retainer.

FIG. 3 is an overhead view of a second material 2 that covers the palatal surface of the upper arch dentition. A number of bulges or protrusions 2a are formed in material 2. Bulges 2a mate with corresponding holes 1a of FIGS. 2A-B to reinforce and strengthen the bond between materials 1 and 2 of retainer R. While three bulges 2a are illustrated bi-laterally in the embodiment of FIG. 3, any number of bulges may be provided in the manner set forth herein corresponding to the holes 1a in material 1. That is to say, in an embodiment, the number of holes 1a in material 1 should have a corresponding and like number of bulges 2a in material 2.

Figure 4:
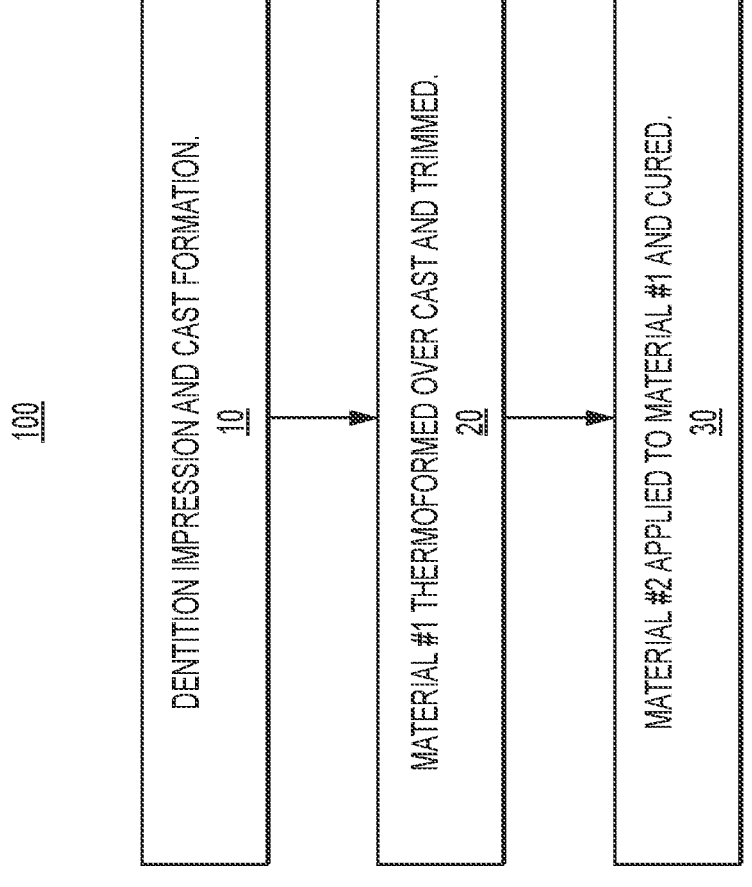
FIG. 4 is a flowchart illustrating the major overall steps of forming the orthodontic retainer.

FIG. 4 illustrates a high-level view of the broad steps involved in making the upper expansion orthodontic retainer. A first step 10 involves making an impression of the upper arch dentition and a corresponding cast based on the impression. A second step 20 involves trimming the cast from step 10 and vacuum thermoforming material 1 over the cast formed in step 10. Step 30 involves application of material 2 to material 1 and bonding thereto through a curing process. Additional specific details of the method of forming the orthodontic retainer are provided with reference to FIGS. 4-6.

Figure 4A:
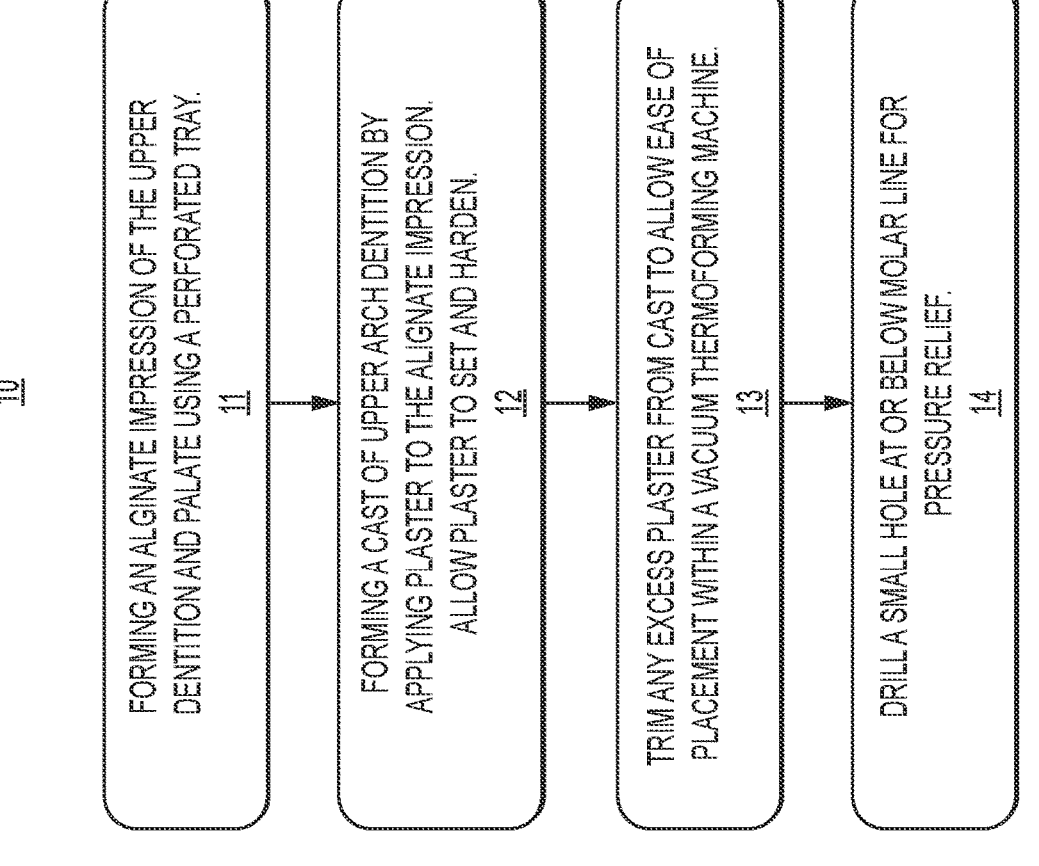
FIG. 4A is a flowchart illustrating specific steps in the formation of a cast and impression used to make the orthodontic retainer.

FIG. 4A is a flowchart illustrating additional specific steps of the broad step 10 involved in forming an impression and cast of a patient's upper arch dentition. First specific step 11 involves forming an alginate impression of the upper dentition and palate using a perforated tray. Alginate is an elastic hydrocolloid material used in the dental practice to form impressions of a patient's teeth.

After step 11 of forming an alginate impression, a cast of the upper arch dentition is formed in step 12 by applying plaster to the impression made in step 11. The plaster is allowed to set and harden. In step 13, any excess plaster used in forming the cast is trimmed to allow ease of placing the cast within a vacuum thermoforming machine. In a non-limiting example, the vacuum thermoforming machine may be an Easy-Vac machine. In step 14, a hole may be drilled at or below the line of the last molar of the cast. The hole allows for pressure relief and removal of air pockets during the vacuum forming process.

FIG. 4B is a flowchart illustrating additional specific steps of the broad step 20 of vacuum forming material 1 over the cast of the maxillary teeth. In step 21, material 1 is placed in a thermoforming machine and heated. Material 1 may be any polymer-based material capable of being vacuum formed. In particular, material 1 may be a polymer such as polyethylene, which provides desirable characteristics such as transparency, stain resistance, and adherence to acrylic materials. Other suitable polymers may likewise be used. After step 21, material 1 is lowered onto the cast in step 22 of the upper arch dentition and vacuum formed through applied suction pressure to form a tight and compact fit over the cast. In step 23, material 1 is allowed to cool, whereby the cooling process may be shortened by applying a cooling spray, such as Ortho Ice or Essix Freeze Spray Coolant. After cooling in step 23, material 1 is cut in proximity to the gingival contours to remove excess amounts of material. Material 1 may be removed from the cast after trimming to allow ease of drilling performed in step 25. In step 25, a number of holes are drilled bi-laterally in the lingual surfaces of material 1. Any suitable number of holes may be used, with three holes on each side shown in the example embodiments of FIGS. 1 and 2.

FIG. 4C is a flowchart illustrating additional specific steps to broad step 30 of applying material 2 to material 1 and bonding the materials together through curing. In step 31, after trimming material 1 (step 24 of FIG. 4B) and drilling the holes therein (step 25 of FIG. 4B), material 1 may be re-positioned on the cast of the upper arch dentition. In step 32, material 2 may be applied to the palatal surface of the cast up to and covering the holes previously formed in material 1. Additional description of step 32 will be provided later in reference to FIG. 5. Material 2 used to cover the palatal surface may be any acrylate suitable for use in a retainer and capable of adherence and bonding with a vacuum formed material. In particular, material 2 may be an acrylate such as methyl methacrylate (MMA). Any other suitable acrylates may be used.

In step 33, materials 1 and 2 are joined together in a curing step. After application of material 2 to the palatal surface of the cast and the lingual holes of material 1, the cast with materials 1 and 2 thereon is placed in a curing machine. In a non-limiting example, the curing machine may be a Wasserman Polyquick Pressure Polymerisation Unit. Following step 33, the retainer formed of materials 1 and 2 may be removed from the cast, then polished and trimmed in step 34. The polishing and trimming in step 34 can remove sharp edges from the retainer and provide a glossy, aesthetically pleasing, and polished appearance.

Referring to FIGS. 5A-D, additional illustrations are provided of the method of applying material 2 as previously discussed in step 32 of FIG. 4C.

Figure 5B:
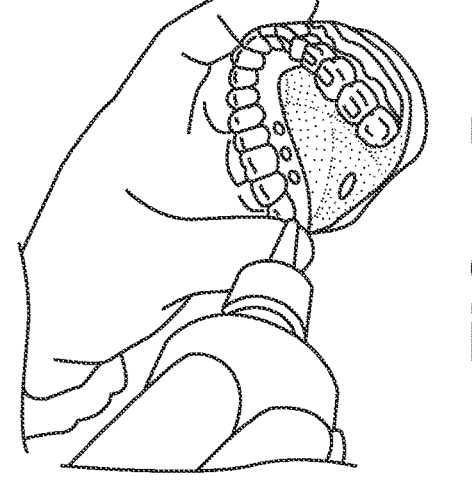
FIGS. 5A-D are first, second, third and fourth views, respectively, illustrating application of the second material of the orthodontic retainer.
Figure 5D:
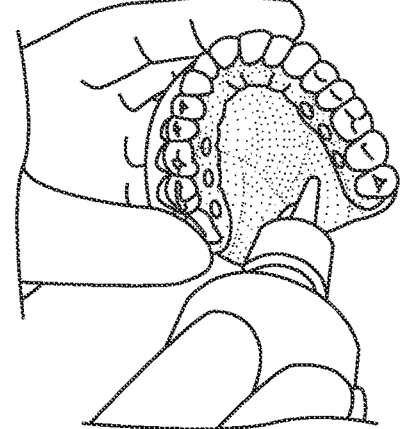
Figure 5A:
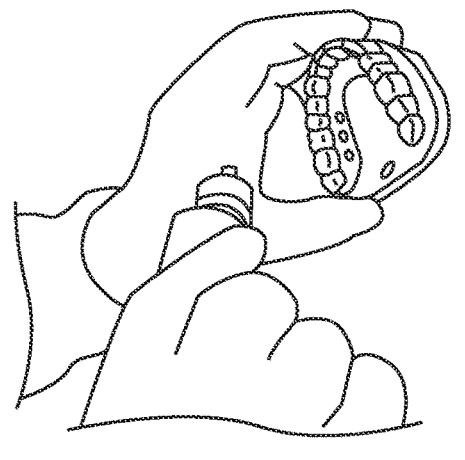
Figure 5C:
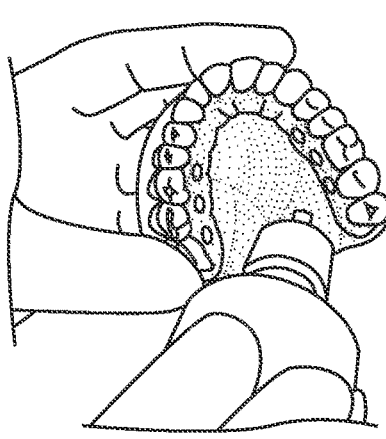

In the case of an acrylate such as methyl methacrylate being used for material 2, a liquid monomer portion of methyl methacrylate (MMA) may be first applied, as shown in FIG. 5A, to the palatal surface of the cast. Pre-polymerized powdered methyl methacrylate spheres are applied in FIG. 5B to the palatal portion already having the liquid monomer MMA applied. Next, in FIG. 5C, liquid monomer MMA is applied joining the liquid and powder combination applied to the palatal surface up to and covering the holes formed in the lingual surface of material 1. The powdered MMA is applied in a similar manner as illustrated in FIG. 5D. The application of liquid and powder MMA may be repeatedly performed as necessary to achieve the desired coverage of the palatal surface up to and covering the lingual holes of material 1. By covering the lingual holes of material 1, a corresponding number of bulges formed of material 2 will thus be formed, mated with the holes in material 1. The steps of alternately applying monomer (liquid) and polymer (powder) can sometimes be referred to as a salt and pepper curing process.

Figure 6B:
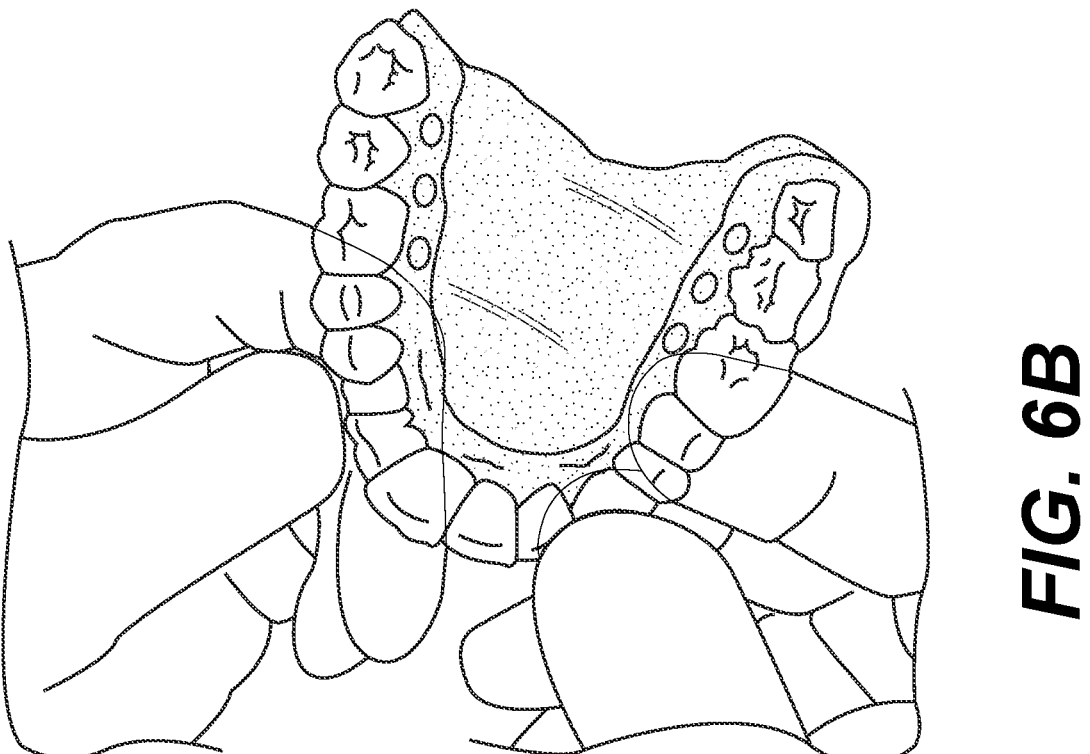
FIG. 6B illustrates the orthodontic retainer after finishing and polishing has been completed.
Figure 6A:
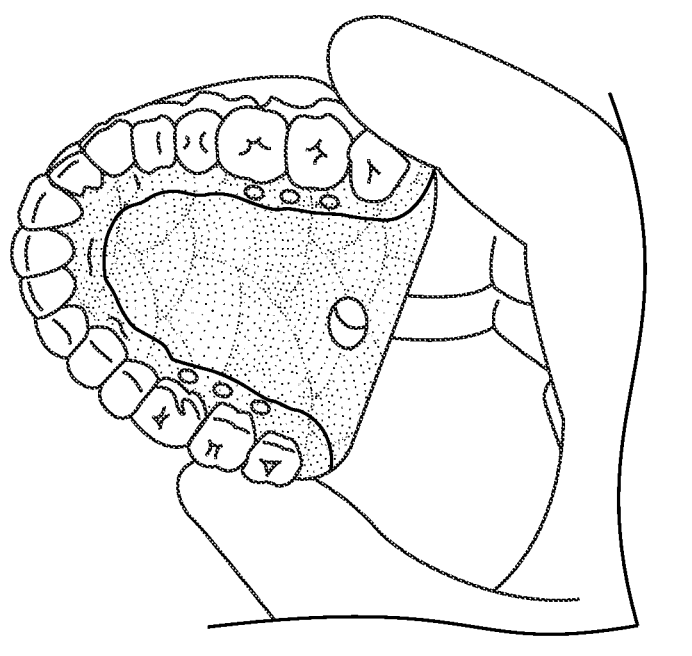
FIG. 6A illustrates the orthodontic retainer after curing has been completed.

FIG. 6A shows the combined materials 1 and 2 formed on the dentition cast. The combined materials may be further cured in a heat and pressure curing machine to strengthen the bonds between the materials. After the curing step, the retainer formed of materials 1 and 2 is removed from the cast and trimmed and polished as needed to form a smooth and aesthetically pleasing retainer, as represented in FIG. 6B.

It is to be understood that the orthodontic retainer and method of forming an orthodontic retainer are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of forming an orthodontic retainer, comprising:

creating a cast based on an impression of a patient's maxillary teeth;

vacuum forming a first material over said cast;

trimming excess first material such that only first material configured to cover facial, lingual, and occlusal surfaces of the patient's maxillary teeth remains on the cast;

removing the first material remaining on the cast to obtain a first portion of the retainer;

trimming said first portion of the retainer along a path following gingival contours of the first portion of the retainer;

drilling a plurality of holes bi-laterally in the lingual surface of the first material of the first portion of the retainer;

applying a second material covering a free palatal portion and the plurality of holes drilled in the first portion of the retainer;

curing said second material to obtain a second portion of the retainer bonded to said first portion of the retainer; and obtaining the orthodontic retainer comprising the first portion of the retainer and the second portion of the retainer, wherein the second portion of the retainer includes a plurality of bulges extending buccally towards the plurality of holes drilled bi-laterally in the lingual surface of the first portion of the retainer in a hole to bulge mating arrangement for facilitating a permanent bonding of the second portion of the retainer to the first portion of the retainer during the curing step.

2. The method of forming an orthodontic retainer as recited in claim 1, wherein said first material comprises a polymer.

3. The method of forming an orthodontic retainer as recited in claim 1, wherein said second material comprises an acrylate.

4. The method of forming an orthodontic retainer as recited in claim 2, wherein said first material is polyethylene.

5. The method of forming an orthodontic retainer as recited in claim 3, wherein said second material is methyl methacrylate.

6. The method of forming an orthodontic retainer as recited in claim 1, wherein said first material is polyethylene and said second material is methyl methacrylate.

7. The method of forming an orthodontic retainer as recited in claim 1, wherein said cast is created by taking an alginate impression of the patient's maxillary teeth and palate using a metal perforated tray, and then using said alginate impression to form the cast from quick-set plaster free of bubbles and any palatal distortion.

\* \* \* \* \*